United States Patent [19]

Harpell et al.

[11] Patent Number: 4,543,286

[45] Date of Patent: * Sep. 24, 1985

[54] COMPOSITE CONTAINING COATED EXTENDED CHAIN POLYOLEFIN FIBERS

[75] Inventors: Gary A. Harpell, Morristown; Sheldon Kavesh, Whippany; Igor Palley, Madison; Dusan C. Prevorsek, Morristown, all of N.J.

[73] Assignee: Allied Corporation, Morris Township, Morris County, N.J.

[ * ] Notice: The portion of the term of this patent subsequent to Sep. 6, 2000 has been disclaimed.

[21] Appl. No.: 554,464

[22] Filed: Nov. 22, 1983

Related U.S. Application Data

[62] Division of Ser. No. 359,976, Mar. 19, 1982, abandoned.

[51] Int. Cl.$^4$ .................... B32B 27/34; D04H 1/58
[52] U.S. Cl. ................... 428/288; 428/292; 428/293; 428/413; 428/480; 428/483
[58] Field of Search ............. 428/287, 288, 286, 293, 428/292, 294, 295, 296, 290, 413, 425, 480, 483

[56] References Cited

U.S. PATENT DOCUMENTS

| | | | |
|---|---|---|---|
| 3,152,949 | 10/1964 | Guthrie | 428/286 X |
| 3,444,025 | 5/1969 | Hillas | 428/394 |
| 3,463,652 | 8/1969 | Whitesel et al. | 428/394 |
| 3,551,280 | 12/1970 | Kippan | 428/394 |
| 3,760,046 | 9/1973 | Schwartz et al. | 428/373 |
| 4,037,010 | 7/1977 | Keller et al. | 428/290 |
| 4,137,394 | 1/1979 | Meihuisen et al. | 528/502 |
| 4,241,132 | 12/1980 | Pratt et al. | 428/290 X |
| 4,350,732 | 9/1982 | Goodwin | 428/286 |
| 4,356,138 | 10/1982 | Kavesh et al. | 264/164 |
| 4,403,012 | 9/1983 | Harpell et al. | 428/286 X |

FOREIGN PATENT DOCUMENTS 0064167 11/1982 European Pat. Off.
2042414 9/1980 United Kingdom.

*Primary Examiner*—Lorraine T. Kendell
*Attorney, Agent, or Firm*—Gus T. Hampilos; Gerhard H. Fuchs

[57] ABSTRACT

High tenacity, high modulus ultrahigh molecular weight fibers of polyethylene or polypropylene are coated with polyethylene, polypropylene or an ethylene and/or propylene copolymer. The coating improves certain properties of the monofilament or multifilament, including adhesion to various matrices in complex composites and resistance of the fiber to fibrillation.

18 Claims, No Drawings

COMPOSITE CONTAINING COATED EXTENDED CHAIN POLYOLEFIN FIBERS

This application is a division of application Ser. No. 359,976, filed Mar. 19, 1982, now abandoned.

DESCRIPTION

BACKGROUND OF THE INVENTION

Extended chain polyethylene and extended chain polypropylene fibers of extremely high tenacity and modulus values are known materials, having been described by various publications of Professor Pennings and co-workers, Smith and Lemstra, and in certain copending commonly assigned patent applications of Kavesh, et al. These mechanical properties are due, at least in part, to the high degree of crystallinity and orientation imparted to the fiber by the production processes, which include either drawing an ultrahigh molecular weight polyolefin from a supersaturated solution or spinning a hot solution of the ultrahigh molecular weight polyolefin through a dye to form a gel fiber. Subsequent processing, including especially a stretching step, impart a high crystallinity and orientation to the polyolefin.

Unfortunately, such extended chain polyolefin fibers have two disadvantageous properties that result directly from a high crystallinity and orientation. First, the high orientation in the longitudinal direction gives the fibers extermely low transverse strengths, with a corresponding tendency of the fibers to fibrillate especially when subjected to abrasion or self-abrasion, particularly when twisted or processed into a fabric. This fibrillation is an undesirable feature in many applications, such as rope, sutures or fabrics. A second disadvantageous property of the extended chain polyolefin fibers is that their crystallinity causes these fibers to have poor adhesion to most matrix materials. This tends to limit the usefulness of these fibers in composite structures.

BRIEF DESCRIPTION OF THE INVENTION

It has been discovered that coating extended chain polyethylene or polypropylene fibers with a polyethylene, polypropylene, ethylene copolymer or propylene copolymer material substantially reduces the tendency of the fibers to fibrillate, increases their transverse strength, enables the fibers to be used in composite structures alone or with a variety of matrix materials and achieves these results without any significant loss of the tenacity and modulus values for the fiber alone, and in some instances with some improvement in these properties which may be attributable to annealing of fiber defects. The coated fibers may be used alone under appropriate conditions of temperature and pressures to produce simple composite structures, which simple composite structures are the subject of an application Ser. No. 359,976 "COMPOSITE CONTAINING POLYOLEFIN FIBER AND POLYMER MATRIX" (now abandoned) filed herewith and commonly assigned.

Accordingly, the present includes a coated polyolefin fiber comprising:

(a) a monofilament or multifilament fiber of polyethylene or polypropylene of weight average molecular weight at least about 500,000 having, in the case of polyethylene, a tenacity of at least about 15 g/denier and a tensile modulus of at least about 300 g/denier and, in the case of polypropylene, a tenacity of at least 8 g/denier and a tensile modulus of at least about 160 g/denier; and (b) a coating on the monofilament and on at least a portion of the filaments of the multifilament containing a polymer having ethylene or propylene crystallinity, said coating being present in an amount between about 0.1% and about 200%, by weight of fiber.

The present invention further includes a composite structure comprising a network of the abovedescribed coated fibers in a matrix which is not a material with ethylene or propylene crystallinity.

DETAILED DESCRIPTION OF THE INVENTION

The coated fiber of the present invention (which forms a part of the composite structure of the present invention) includes an extended chain polyolefin fiber, which may be ultrahigh molecular weight polyethylene or ultrahigh molecular weight polypropylene. Suitable polyethylene fibers are made of polyethylene having a weight average molecular weight at least about 500,000, preferably at least about 1 million and more preferably between about 2 million and about 5 million. The fiber may be grown by solution techniques, is described in more detail in pending U.S. application Ser. No. 225,288, filed Jan. 15, 1981, commonly assigned and co-pending, or by other solution processes in which the polyolefin is drawn from a supersaturated solution, including those described in various publications of Pennings, et al and in U.S. Pat. No. 4,137,394 to Meihuisen, et al. The polyolefin fiber may also be produced by processes involving the spinning of polyolefin solutions to form a gel structure upon cooling, and especially in such a process as described in copending application Ser. No. 259,266, of Kavesh, et al, filed April 30, 1981, and a continuation-in-part thereof of Ser. No. 572,607 filed herewith, both copending and commonly assigned. Other solution spinning (gel) processes may also be used, such as those described in various other works of Pennings and coworkers, in various publications and applications of Smith and Lemstra including UK application GB No. 2,051,667 and Ger. Off. No. 3004699 or by similar techniques. Polyethylene fibers formed by melt spinning under controlled conditions, such as described in U.S. Pat. No. 4,228,118 or British Pat. No. 1,469,526 may also be used, but are generally less preferred than fibers produced either by drawing from supersaturated solutions or by spinning solutions via a gel.

The polyethylene fibers used have tenacity values of at least about 15 g/denier, preferably at least about 20 g/denier, more preferably at least about 25 or 30 g/denier and most preferably at least about 40 g/denier. Correspondingly, the preferred tensile modulus values for the polyethylene fibers are at least about 300 g/denier, preferably at least about 500 g/denier, more preferably at least about 750 or 1,000 g/denier and most preferably at least about 1,500 g/denier. In general, the tenacity and modulus values are directly related and rise together in a relatively linear fashion for most of the processes used, but it is contemplated that for certain applications fibers selected for particularly high tenacities, without regard to modulus, or with particularly high modulus, without regard to tenacity, such as are produced by melt spinning, may be used. Thus, for example, in the application of coated fibers for sutures, the elongation value is particularly important. For coated fibers and composites used in ballistic applications, as described in greater detail in an application of the same inventors as the present application, entitled "Ballistic Article Containing Polyolefin Fiber" (Ser. No. 359,975, now U.S. Pat. No. 4,403,012), filed herewith and commonly assigned, both tenacity and modulus values are extremely important.

The melting point of the polyolefin fiber is not a particularly critical value in the present invention, but the melting point is generally above about 138° C. (e.g. 145°-155° C.) for polyethylene fibers and above about 168° C. (e.g. 170°-173° C.) for polypropylene fibers. Other properties, which are not critical but may have importance for particular applications, include work to break values (as measured by ANSI/ASTM D-2256), creep values (as measured, for example, under 10% of breaking load for 50 days at room temperature), elongation to break, elongation at yield, UV stability, oxidative stability, thermal stability and hydrolytic stability. It is expected that most, if not all, of these other properties obtained by the polyolefin fiber will correspond to similar, linearly dependent or enhanced values for the coated polyolefin fiber.

The polyethylene fiber used in the present invention may be either a monofilament or a multifilament, with multifilaments of from 2-500 or more strands being contemplated, and with arrangements varying from totally parallel filaments, to wound filaments, to braided and twisted strands also being contemplated. In the case of multifilaments of other than parallel arrangement, it is contemplated that the winding or other rearrangement of the filament may occur before, during or after application of the coating. Furthermore, it is contemplated that the coated fibers of the present invention may either be extremely long fibers (referred to sometimes as being of substantially indefinite length), of relatively short pieces, or even of extremely short pieces as, for example, in resins reinforced by short fibers (e.g., bulk molding compounds or sheet molding compounds).

Similarly, extended chain polypropylene fibers may be used with generally the same geometries, molecular weights, fiber-forming processes and filament structure as the extended chain polyethylene fibers. The major difference resides in the properties of the fiber, with polypropylene fibers of tenacity at least about 8 g/denier, and preferably at least about 15 g/denier, and of tensile modulus at least about 160 g/denier, preferably at least about 200 g/denier, being suitable. In addition, the extended chain polypropylene fibers will have a main melting point significantly higher than the corresponding polyethylene fibers, although the melting point is not a critical feature of the polypropylene fiber. Representative main melting points for extended chain polypropylene fibers are from about 168° to about 180° C., or typically between about 168° and about 173° C., preferably at least about 170° C.

Suitable coating materials for the coated fibers of the present invention include polyethylene of various forms, polypropylene of various forms, ethylene copolymers of various forms having at least 10% ethylene crystallinity, propylene copolymers of various forms having at least 10% propylene crystallinity and various ethylene-propylene copolymers. Polyethylene coatings may be either low density (having, for example, about 0.90-0.94 specific gravity), high density (having, for example, about 0.94-0.98 specific gravity), with various amounts of branching, linearity, relatively minor comonomers as found in materials generally labeled as "polyethylene", molecular weights, melt viscosities, and other values. For certain applications high density polyethylene is preferred, while for other applications low density is preferred. Suitable polypropylene coatings include isotactic, atactic and syndiotactic polypropylene. The isotactic or amorphous polypropylene is generally less preferred, however, compared to the two crystalline forms.

Suitable ethylene copolymer coatings include copolymers of ethylene with one or more other olefinically unsaturated monomers from several broad classes. Similarly suitable propylene copolymers include copolymers of propylene with one or more olefinically unsaturated monomers from several broad classes: 1-monoolefins, olefins containing one terminal polymerizable double bond and one or more internal double bond or bonds.

For many applications, the ethylene or propylene content of the copolymers is preferably higher than that minimum necessary to achieve about 10 volume percent ethylene or propylene crystallinity. Especially when strong adherence of the coating to the fiber is desired, it is preferred that the ethylene or propylene crystallinity be at least about 25 volume percent, more preferably at least about 50 volume percent, and most preferably at least about 70 volume percent. These values are achieved, for example, in the ethylenebutene-1 copolymers indicated on page 355 of the *Encyclopedia of Polymer Technology* as 3, 9, and 18 branches/1000 carbon atoms, corresponding to 90%, 80% and 70% ethylene crystallinity. Ethylene-vinyl acetate copolymers of 5, 10 and 15 mol % vinyl acetate correspond to approximately 55%, 40% and 25% crystallinity.

The proportion of coating compared to fiber may vary over a wide range depending upon the application for which the coated fibers are to be used. A general broad range is from about 0.1 to about 200% coating, by weight of fiber. For coated fibers to be used in purely fiber applications, as in rope, sutures and the like, a preferred coating amount is between about 10 and about 50%, by weight of fiber. The same or lower proportion of coating may be used when the coated fiber is to be used to form a simple composite in which the coating is fused into a continuous matrix. Higher amounts of coating may be preferred for other applications such as composites containing other fibers (e.g. glass fibers) and/or fillers, in which coating amounts of 50-200%, 75-150% and 75-100% are preferred, more preferred and most preferred.

The coating may be applied to the fiber in a variety of ways. One method is to apply the neat resin of the coating material to the stretched high modulus fibers either as a liquid, a sticky solid or particles in suspension or as a fluidized bed. Alternatively, the coating may be applied as a solution or emulsion in a suitable solvent which does not adversely affect the properties of the fiber at the temperature of application. While any solvent capable of dissolving or dispersing the coating polymer may be used, preferred groups of solvents include paraffin oils, aromatic solvents or hydrocarbon solvents, with illustrative specific solvents including paraffin oil, xylene, toluene and octane. The techniques used to dissolve or disperse the coating polymers in the solvents will be those conventionally used for the coating of similar polymeric materials on a variety of substrates.

Other techniques for applying the coating to the fibers may be used including coating of the high modulus precursor before the high temperature stretching operation, either before or after removal of the solvent from the fiber. The fiber may then be stretched at elevated temperatures to produce the coated fibers. The extruded gel fiber may be passed through a solution of the appropriate coating polymer (solvent may be paraffin oil, aromatic or aliphatic solvent) under conditions to attain the desired coating. Crystallization of the high molecular weight polyethylene in the gel fiber may or may not have taken place before the fiber passes into the cooling solution. Alternatively, the fiber may be extruded into a fluidized bed of the appropriate polymeric powder.

In addition to polymeric coatings, fillers such as carbon black, calcium carbonate, silica or barium ferrite may also be incorporated to attain desired physical properties, e.g. incorporation of carbon black to obtain U.V. protection and/or enhanced electrical conductivity.

Furthermore, if the polyolefin fiber achieves its final properties only after a stretching operation or other manipulative process, e.g. solvent exchanging, drying or the like, it is contemplated that the coating may be applied to a precursor material of the final fiber. In such cases, the desired and preferred tenacity, modulus and other properties of the fiber should be judged by continuing the manipulative process on the fiber precursor in a manner corresponding to that employed on the coated fiber precursor. Thus, for example, if the coating is applied to the xerogel fiber described in U.S. application Ser. No. 259,266 and the continuation-in-part thereof of Ser. No. 572,607 to Kavesh et al, and the coated xerogel fiber is then stretched under defined temperature and stretch ratio conditions, then the fiber tenacity and fiber modulus values would be measured on uncoated xerogel fiber which is similarly stretched.

The coated fibers of the present invention may be further processed for use in a variety of applications such as preparation of composites using coated fibers alone, weaving, felts, fabrics and non-woven and knitted articles.

In addition, the coated fibers of the present invention may be used to form the complex composite structures of the present invention. Such complex composites contain the coated fibers (either monofilament or multifilament) described above, formed into a network of conventional type, such as completely parallel fibers, layers of parallel fibers rotated between layers in a variety of ways, randomly oriented lengths of fibers (including felts) and other arrangements. In addition to such coated fiber network, the complex composites include a matrix different from the coating material which may be a thermosetting polymeric material, a thermoplastic polymeric material, an elastomeric polymeric material or even various non-polymeric materials. Suitable matrices include thermoset polymers such as epoxies, unsaturated polyesters, polyurethanes, polyfunctional allyl polymers (e.g. diallyl phthalate), urea-formaldehyde polymers, phenol-formaldehyde polymers and vinyl ester resins; thermoplastic matrices such as poly-1-butene, polystyrene, styrene copolymers, polyvinyl chloride and ABS resin (it will be appreciated that polyethylene, polypropylene, ethylene copolymers and propylene copolymers, as matrices, are covered in our application Ser. No. 359,976); elastomers matrices such as polybutadiene, butadiene copolymers, thermoplastic elastomers (e.g. polystyrene-polyisoprene-polystryene, polystyrene-polybutadiene-polystyrene and polystyrene-hydrogenated diene-polystyrene), sulfonated ethylenepropylene-diene terepolymer and metal salts of this terpolymer and silicone elastomers, and non-polymeric substrates such as concrete. Such complex composite structures have special utility in ballistic applications, boat hulls, motorcycle helmets, road surfacing, building constructions, films, hoses and belts. Composite structures may be prepared using chopped coated fiber of this invention alone (simple composites) or together with other thermoplastics and thermoset matrices (called complex composites and described more fully herein).

In addition to the coated fiber and the matrix, other materials may be present in the complex composite, including lubricants, fillers, adhesion agents, other fiber materials (e.g. aramids, boron fibers, glass fibers, glass microballoons, graphite fibers and mineral fibers such as mica, wollastonite and asbestos) in various regular or irregular geometric arrangements. For those composite structures in which strong adherence between the coated polyloefin fiber and matrix is desired, the coating should be selected for good adhesion with the matrix material. In general, adhesion can be improved by using ethylene copolymers or propylene copolymers having comonomers with similar ionic character, aromatic character or other properties of the matrix. For example, in the case of epoxy matrices, relatively ionic monomers such acrylic acid, vinyl acetate or methacrylic acid will, in general, improve the adhesion of the coated fiber to the epoxy matrix compared to the adhesion of the corresponding uncoated fiber with the same epoxy matrix. In the case of polyester matrices, some preferred comonomers in the coating include acrylic acid, 1,4-hexadiene, vinyl alcohol and unreacted free radically polymerizable monomers (e.g. acrylates). Also suitable are block and graft copolymers of polyethylene with polybutadiene and the reaction product of ethylene-acrylic acid copolymer with glycidol methacrylate. In the case of matrices composed of polyurethanes, preferred coatings include hydroxyl-containing polyethylene copolymers such as ethylene-vinyl alcohol copolymers. Various suitable thermoplastic matrices and corresponding representative preferred comonomers for the coating material are indicated in Table 1 below.

TABLE 1

| Matrix | Preferred Coatings |
|---|---|
| 1. ABS, polystyrene or polystyrene-polybutadiene-polystyrene | 1. Ethylene-polystyrene block and graft copolymers |
| 2. Sulfonated polyethylene and its salts | 2. Ethylene-acrylic acid copolymers |
| 3. Polyvinyl chloride | 3. Ethylene-vinyl chloride graft copolymers |
| 4. Thermoplastics containing carboxylic acids | 4. Ethylene-acrylic (or methacrylic) acid copolymers |
| 5. Sulfonate ethylene-propylene-diene elastomers | 5. Ethylene-acrylic acid copolymers or sulfonated polyethylene |
| 6. Concrete | 6. Ethylene-acrylic acid copolymer |

The properties of these complex composites will generally include various advantageous properties derived from the coated fiber, and especially for the extended chain polyolefin fiber component of the coated fiber, including especially tenacity and modulus, but in some instances also including dimensional stability, low water absorption and chemical stability. The complex composites may also have advantageous properties derived from the matrix material including, for example, high heat distortion temperature, appropriate flexibility or stiffness and abrasion resistance. The coating component generally does not contribute substantially to the mechanical or other properties of the composite except insofar as it improves the inherent properties of the extended chain polyolefin as described above in connection with the novel coated fiber, e.g. by improving the transverse strength of a multifilament fiber.

Furthermore, the proportion of coated fiber (or for that matter, extended chain polyolefin fiber) in the composite is not critical, but may have preferred values for various applications.

The coated fibers and complex composite structures of the present invention may be formed into a variety of articles. For example, vests may be made containing either knitted or woven or non-woven fabric of the present coated fiber, relatively rigid portions of the composite of the present invention, or a combination of these. Helmets may be fabricated employing the complex composites of the present invention using a thermosetting matrix. Shielding for helicopters, tanks and other articles where ballistic-resistance articles are desired may also be formed out of either the coated fiber or complex composite of the present invention, with the matrix material especially being selected based upon the desired physical properties of the shielding material. Such articles are described in more detail in the corresponding application entitled "Ballistic Article Containing Polyolefin Fiber," (Ser. No 359,975 now U.S. Pat. No. 4,403,012), of the present inventors, commonly assigned and filed herewith.

For other applications, complex composites of the present invention may be formed into a variety of conventional geometric arrangements.

The polyethylene/ethylene copolymer coatings may be crosslinked by crosslinking techniques known in the art such as the use of peroxides, sulfur or radiation cure systems, or may be reacted with polyfunctional acid chlorides or isocyanates in order to obtain a crosslinked coating on the high modulus fibers.

EXAMPLES

An ultrahigh molecular weight polyethylene (intrinsic viscosity of 17 dL/g in decalin at 135° C.) was dissolved as a 7 weight % solution in paraffin oil at 220° C. The solution was extruded through a 16 hole die (with one millimeter diameter holes) to produce a gel fiber at the rate of 1.8 m/min. The fiber was extracted with trichlorotrifluoroethane and dried. The filaments were stretched in a one meter long tube at 145° C. at a feed roll speed of 25 cm/min to a stretch ratio of 19:1 to produce a 625 denier yarn having a tenacity of 19 g/denier, a modulus of 732 g/denier and an elongation to break of 4.4%. These fibers were used in Example 2.

A similar fiber preparation (but as a monofilament) involved dissolving the same polymer to a 5 weight % solution at 200° C. and extruding through a single two millimeter diameter die to produce a gel fiber at 598 cm/min. The extracted and dried fiber was stretched in the one meter long tube at 130° C. at a stretch ratio of 19:1 to produce a 65 denier fiber having a tenacity of 14.5 g/denier, a modulus of 366 g/denier and an ultimate elongation of 6%. This monofilament fiber was used in Example 3.

A similar multifilament fiber employed an 18 IV polyethylene dissolved to 6 weight % in paraffin oil at 220° C. Extruding the solution through a 16 hole die (with 0.76 mm hole diameters) produced gel fiber at 3.08 m/min. The wet gel fiber was stretched at 100° C. to a stretch ratio of 11:1, extracted and dried. The 198 denier yarn produced had a tenacity of 25 g/denier, a modulus of 971 g/denier and an elongation of 4.5% and was used in Example 4.

EXAMPLE 1

Preparation of Gel Fiber

A high molecular weight linear polyethylene (intrinsic viscosity of 17.5 in decalin at 135° C.) was dissolved in paraffin oil at 220° C. to produce a 6 weight solution. This solution was extruded through a sixteen-hole die (hole diameter 1 mm) at the rate of 3.2 m/minute. The oil was extracted from the fiber with trichlorotrifluoroethane and then the fiber was subsequently dried.

Coating of Gel Fiber

The multifilament fibers was passed through a solution of low density polyethylene (Union Carbide DPDA 6169WT; Density 0.93; $MI_2=6$), 35 g dissolved in 500 mL of toluene at 75° C. at the rate of 1.5 m/minute and then twice through a bath of trichlorotrifluoroethane and finally dried. The fiber increased in weight by 19.5%.

Stretching of Fiber

The coated fiber was stretched to a stretch ratio of 20:1 in a 100 cm long tube heated to 140° C., using a feed roll speed of 25 cm/minute to produce a single filament of 208 denier. Tensile testing of the coated fiber showed a tensile strength of 19.9 g/denier and a modulus of 728 g/denier.

Uncoated fiber was stretched in an identical manner to produce a multifilament yarn. Tensile testing of this uncoated fiber showed a tensile strength (tenacity) of 18.9 g/denier and a modulus of 637 g/denier.

As can be seen from the data, the coated fiber has a higher tensile strength and modulus in spite of the fact that 20% of the fiber weight consists of low density polyethylene coating.

By contrast, the Rule of Mixing would suggest (ignoring second order effects) that the coated fiber modulus would be $0.8 \times 638 = 509$ g/denier and that the coated fiber tensile strength would be $0.8 \times 18.9 = 15.1$ g/denier. The actual values are 143% and 132% of theory.

The coated fiber was then tied around a small post, making five knots (each knot drawn down on the previous knot). Examination under an optical microscope indicated that no fibrillation occurred, a result particularly significance for suture applications.

EXAMPLE 2

Single 13 denier ECPE filaments (modulus 732 g/denier, tensile strength 19 g/denier) were dipped into a solution of ethylene-acrylic acid copolymer (Dow EAA-455, containing 0.932 milliequivalents acrylic acid/g polymer) in toluene under conditions shown in Table 1. The fiber was removed, allowed to dry in air and then subsequently embedded in an epoxy resin, Devkon 5 minute epoxy manufactured by Devkon Corporation, to a depth of 5 mm. The resin was cured at room temperature for one hour, and then heated in an air-circulating oven for 30 minutes at 100° C.

The fibers were pulled on an Instron tensile tester at 1 inch/minute (2.54 cm/min). Results given in Table 2 (each the average of two runs) indicate that, under all conditions of dipping evaluated, improvement of adhesion over that of the unmodified fiber occurred. Under best conditions (one run of Sample C), the fiber broke rather than being pulled out of the resin.

TABLE 1

| Sample | Polymer Conc. (g/L) | Dip Time | Dip Temp | Adhesive Force (pounds-Newtons) |
|---|---|---|---|---|
| A | 20 | 2 sec | 95° C. | 0.34–1.51 |
| B | 20 | 6 sec | 95° C. | 0.43–1.91 |
| C | 20 | 15 min | 95–75° C. | 0.79–3.52 |
| D | undipped control | — | — | 0.14–0.62 |
| E | 40 | 30 sec | 104° C. | 0.52–2.31 |
| F | 40 | 2 min | 105° C. | 0.41–1.82 |
| G | 40 | 5 sec | 95° C. | 0.71–3.16 |
| H | 40 | 2 sec | 85° C. | 0.47–2.09 |
| I | 40 | 2 sec | 75° C. | 0.47–2.09 |
| J | undipped control | — | — | 0.19–0.85 |
| K | 60 | 30 sec | 105° C. | 0.63–2.80 |
| L | 60 | 2 min | 105° C. | 0.79–3.52 |
| M | 60 | 5 sec | 104° C. | 0.58–2.58 |
| N | 60 | 5 sec | 95° C. | 0.46–2.05 |
| O | 60 | 2 min | 85° C. | 0.66–2.94 |
| P | undipped control | — | — | 0.18–0.80 |

EXAMPLE 3

An extended chain polyethylene fiber of 14.5 g/denier tenacity and 366 g/denier modulus prepared by stretching a xerogel at a 19:1 stretch ratio at 130° C. was cut into approximately 40 cm pieces. Some of the pieces were tied into knots and thereupon fibrillated extensively, with examination under an optical microscope at 50×magnification showing microfibrillae approximately 8–9 micrometers in diameter.

Other pieces of the fiber were dipped one, two or three times (two each for six total coated fibers) in a 8 weight % solution of PAXON EA-55-180 polyethylene (an ethylene hexene-1 copolymer having density of 0.955 and a $MI_2 = 18$) in xylene at 100° C.

Five knots were then tied in each fiber (around a small post) each knot drawn down on the previous knot). The coating on the once-dipped fibers appeared about one micrometer thick. One fibril was seen on one once-dipped fiber, no fibrils on the other. The coatings on the twice-dipped fibers appeared about three micrometers thick. No fibrillation was observed, but the coating on one section of one fiber detached and ended about three micrometers from the fiber. The coating on the thrice-dipped fibers varied in thickness (six micrometers in the thickest portion) and showed no fibrillation after five knots.

EXAMPLE 4

An extended claim polyethylene fiber of 25 g/denier tenacity and 971 g/denier modulus was coated in one of two treatment regimes with various polymers in xylene solution (at 60 or 120 g/L concentration). The first regime was to dip the fiber in the solution for two minutes and then dry. The second regime was to dip for 30 seconds, dry in air for three minutes and then (for four repetitions) dip for two seconds and dry for three minutes. All of the coated fibers were then placed in a rectangular parallelopiped mold of an epoxy resin (the same resin as Example 2) which was then cured at 25° C. for 24 hours.

A force was then applied to the fiber end sticking out of the cured epoxy resin at a rate of 2 inches/minute (5.1 cm/min). A force at pull-out ("$f_{PO}$") was measured and a Shear Stress At Break ("$S_B$") calculated. The results are displayed in Table 2.

TABLE 2

| Run | Polymer* | Conc (g/L) | Temp °C. | Regime | $F_{PO}$ N | $S_B$ kPa |
|---|---|---|---|---|---|---|
| A | EAAO | 60 | 87 | First | 0.98 | 1580 |
| B | EAAO | 60 | 87 | Second | 1.20 | 2000 |
| C | PE-AA | 60 | 105 | First | 1.38 | 2270 |
| D | PE-AA | 60 | 205 | Second | 1.56 | 2620 |
| E | EAA2 | 60 | 95 | First | 1.33 | 2340 |
| F | EAA5 | 60 | 95 | First | 1.42 | 2340 |
| G | OPE2 | 60 | 95 | First | 1.25 | 2070 |
| H | OPE2 | 120 | 95 | First | 1.56 | 2620 |
| I | OPE6 | 60 | 95 | First | 1.47 | 2400 |
| J | OPE6 | 120 | 95 | First | 1.38 | 2270 |
| uncoated fiber | — | — | — | — | 0.67 | 1100 |

*The polymers used were:
EEAO - a low molecular weight ethylene-acrylic acid copolymer of acid number 120 sold by Allied Corporation as AC ®-5120 copolymer
PE-AA - a polyethylene graft acrylic acid having 6% acrylic acid sold by Reichhold Chemical as PE-452
EAA2 - an ethylene-acrylic acid copolymer of acid number 49.2 sold by Dow Chemical as Dow-PE-452.
EAA5 - an ethylene-acrylic acid copolymer of acid number 52 sold by Dow Chemical as EAA-455
OPE2 - an oxidized polyethylene of acid number 28 sold by Allied Corporation as AC ®-392 oxidized polyethylene
OPE6 - An oxidized polyethylene of acid number 16 sold by Allied Corporation as AC ® 316A oxidized polyethylene

EXAMPLE 5

Continuous Coating of Polyethylene Fibers With Ethylene Acrylic Acid Copolymer

Preparation of Gel Fiber

An ultrahigh molecular weight polyethylene (intrinsic viscosity of 17.5 dL/g in decalin at 135° C.) was dissolved as a 6 weight % solution in paraffin oil at 220° C. The solution was extruded through a 16 hole die (with 1.0 millimeter diameter holes) to produce a gel fiber at the rate of 3.2 m/min. The fiber was extracted with trichlorotrifluoroethane and dried.

Coating Fiber

The dry undrawn fiber (7.0 g) was passed through a 600 mL of toluene containing 24 g of a dissolved ethylene-acrylic acid copolymer (Dow EAA-455 copolymer having Acid No.=52.3, i.e. requires 52.3 mg of potassium hydroxide to neutralize 1 g of sample) at 105° C. at the rate of 1.5 meters/min. After passing through the solution, the fiber passed through a trichlorotrifluoroethane and then dried, giving a fiber weight of 8.06 g. This fiber was then stretched in a 100° C. tube at 140° C., using a feedroll speed of 25 cm/min. The resultant fiber had a denier of 234, tenacity of 20.2 g/d, modulus of 696 g/d and ultimate elongation of 3.9%.

Adhesion to Epoxy Resin

Adhesion to epoxy matrix was determined in the same manner as in Example 4. Force required to pull fiber out of the matrix was 1.33 N (0.30 lb) and shear stress was 2340 kPa (340 lb/in).

What is claimed is:

1. A composite comprising a matrix and:
   (a) a monofilament or multifilament fiber of polyethylene or polypropylene of weight average molecular weight at least about 500,000 having, in the case of polyethylene, a tenacity of at least about 15 g/denier and a tensile modulus of at least about 300 g/denier and, in the case of polypropylene, a tenacity of at least 8 g/denier and a tensile modulus of at least about 160 g/denier; and (b) a coating on the monofilament and on at least a portion of the filaments of the multifilament containing a polymer having ethylene or propylene crystallinity, said coating being present in an amount between about 0.1% and about 200%, by weight of fiber.

2. The composite of claim 1 wherein said matrix is a thermoplastic polymer.

3. The composite of claim 1 wherein said matrix is a thermosetting polymer.

4. The composite of claim 1 wherein said matrix is an elastomer.

5. The composite of claim 1 wherein said coating is an ethylene copolymer having at least about 10 volume percent ethylene crystallinity.

6. The composite of claim 5 wherein said matrix is an epoxy matrix.

7. The composite of claim 5 wherein said matrix is an unsaturated polyester matrix.

8. The composite of claim 5 wherein said matrix is a polyurethane matrix.

9. The composite of claim 1 wherein said fiber is a polyethylene multifilament.

10. The composite of claim 9 wherein said polyethylene has a weight average molecular weight at least about 1,000,000.

11. The composite of claim 9 wherein said polyethylene has tenacity of at least about 25 g/denier and a modulus of at least about 750 g/denier.

12. The composite of claim 9 wherein said polyethylene has a tenacity of at least about 30 g/denier and a modulus of at least about 1000 g/denier.

13. The composite of claim 12 wherein said polyethylene has a modulus of at least about 1500 g/denier.

14. The composite of claim 1 wherein said coating is polyethylene.

15. The composite of claim 14 wherein said polyethylene coating has specific density of between about 0.90 and about 0.94.

16. The composite of claim 14 wherein said polyethylene coating has a specific density between about 0.94 and about 0.98.

17. The composite of claim 1 wherein said ethylene copolymer has at least about 25 volume percent ethylene crystallinity.

18. The composite of claim 1 wherein said fiber is a polypropylene multifilament.

* * * * *